US011781499B2

(12) United States Patent
Kingsborough

(10) Patent No.: US 11,781,499 B2
(45) Date of Patent: Oct. 10, 2023

(54) ENGINE SYSTEM WITH FUEL SYSTEM CONTROL ARRANGEMENT AND METHOD FOR CONTROLLING FUEL INJECTION IN AN INTERNAL COMBUSTION ENGINE

(71) Applicant: VOLVO TRUCK CORPORATION, Gothenburg (SE)

(72) Inventor: Kyle Kingsborough, Carlisle, PA (US)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/791,582

(22) PCT Filed: Mar. 2, 2020

(86) PCT No.: PCT/US2020/020619
§ 371 (c)(1),
(2) Date: Jul. 8, 2022

(87) PCT Pub. No.: WO2021/177935
PCT Pub. Date: Sep. 10, 2021

(65) Prior Publication Data
US 2023/0033159 A1    Feb. 2, 2023

(51) Int. Cl.
*F02D 41/18* (2006.01)
*F02D 41/14* (2006.01)

(52) U.S. Cl.
CPC ....... *F02D 41/182* (2013.01); *F02D 41/1441* (2013.01); *F02D 41/1458* (2013.01);
(Continued)

(58) Field of Classification Search
CPC ............... F02D 41/182; F02D 41/1441; F02D 41/1458; F02D 41/1463; F02D 2041/1433;
(Continued)

(56) References Cited

U.S. PATENT DOCUMENTS

| 5,730,112 A | 3/1998 | Jeong |
| 2006/0130457 A1 | 6/2006 | Hirowatari et al. |

(Continued)

FOREIGN PATENT DOCUMENTS

EP    1479898 A2    11/2004

OTHER PUBLICATIONS

International Search Report (dated May 14, 2020) for corresponding International App. PCT/US2020/020619.

*Primary Examiner* — Joseph J Dallo
(74) *Attorney, Agent, or Firm* — WRB-IP PLLC

(57) ABSTRACT

An engine system including a fuel system control arrangement includes an internal combustion engine including an exhaust line, one or more cylinders, and one or more fuel injectors corresponding to the one or more cylinders, means for determining fresh air mass flow into an intake to the engine, a nitrogen oxide (NOx) sensor in the exhaust line, and a controller configured to determine oxygen (O2) in exhaust gas based on a signal from the NOx sensor and to calculate a current fuel injection quantity based on the O2 in the exhaust gas and determined fresh air mass flow into the intake, to compare the current fuel injection quantity to a theoretical fuel injection quantity under current operating conditions, and to adjust an amount of fuel injection from the one or more fuel injectors when the current fuel injection quantity differs from the theoretical fuel injection quantity to make the current fuel injection quantity closer to the theoretical fuel injection quantity.

20 Claims, 6 Drawing Sheets

(52) U.S. Cl.
CPC .. *F02D 41/1463* (2013.01); *F02D 2041/1433* (2013.01); *F02D 2200/0616* (2013.01)

(58) Field of Classification Search
CPC ............. F02D 2200/0616; F02D 41/22; F02D 41/146; F02D 41/2454; F02D 41/2467; F02D 41/1454; F02D 41/18; F02D 41/34; Y02T 10/40
See application file for complete search history.

(56) References Cited

U.S. PATENT DOCUMENTS

| | | |
|---|---|---|
| 2007/0074709 A1 | 4/2007 | Kato et al. |
| 2007/0256405 A1 | 11/2007 | Gabe et al. |
| 2008/0011282 A1 | 1/2008 | Miyashita |
| 2009/0019836 A1 | 1/2009 | Nagaoka et al. |
| 2016/0363106 A1 | 12/2016 | Mori et al. |
| 2019/0153969 A1 | 5/2019 | Le Louvetel-Poilly et al. | ns

ENGINE SYSTEM WITH FUEL SYSTEM CONTROL ARRANGEMENT AND METHOD FOR CONTROLLING FUEL INJECTION IN AN INTERNAL COMBUSTION ENGINE

BACKGROUND AND SUMMARY

The present invention relates generally to engine systems with fuel system control arrangements and methods therefor and, more specifically, to such systems and methods wherein fuel injection quantity is adjusted to correspond to a theoretical fuel injection quantity.

Fuel system controllers serve many different purposes including emissions reduction, combustion control, and fuel economy benefits. With increasing emissions regulations there is always a need to reduce emissions levels from the engine. Delivering too little or too much fuel can have a significant impact on emissions levels, as well as performance. Engine modeling permits calculation of theoretical fuel injection quantities that should, under the desired operating conditions, achieve desired emissions levels, combustion, and fuel economy.

For various reasons, the physical equipment for delivering fuel to engine cylinders, such as fuel pumps, and fuel injectors, does not always deliver fuel to the cylinders in the quantities that engine modeling calls for. These factors may include age of the equipment, clogging of lines, and tolerances for the equipment.

It is desirable to provide an engine system that can adjust fuel injection when actual fuel injection quantities differ from theoretical fuel injection quantities. It is further desirable to provide such a system in a simple and an inexpensive manner.

According to an aspect of the present invention, an engine system including a fuel system control arrangement comprises an internal combustion engine comprising an exhaust line, one or more cylinders, and one or more fuel injectors corresponding to the one or more cylinders, means for determining fresh air mass flow into an intake to the engine, a nitrogen oxide (NOx) sensor in the exhaust line, and a controller configured to determine O2 in exhaust gas based on a signal from the NOx sensor and to calculate a current fuel injection quantity based on the oxygen (O2) in the exhaust gas and determined fresh air mass flow into the intake, to compare the current fuel injection quantity to a theoretical fuel injection quantity under current operating conditions, and to adjust an amount of fuel injection from the one or more fuel injectors when the current fuel injection quantity differs from the theoretical fuel injection quantity to make the current fuel injection quantity closer to the theoretical fuel injection quantity.

According to another aspect of the present invention, a method for controlling fuel injection in an internal combustion engine, the engine comprising an exhaust line, one or more cylinders, and one or more fuel injectors corresponding to the one or more cylinders, comprises determining fresh air mass flow into an intake to the engine, determining O2 in exhaust gas from the engine, calculating a current fuel injection quantity based on the O2 in the exhaust gas and determined fresh air mass flow into the intake, comparing the current fuel injection quantity to a theoretical fuel injection quantity under current operating conditions, and adjusting an amount of fuel injection from the one or more fuel injectors when the current fuel injection quantity differs from the theoretical fuel injection quantity to make the current fuel injection quantity closer to the theoretical fuel injection quantity.

The system and method according to the present invention facilitates correcting fuel injection to correspond to theoretical fuel injection values using equipment that is ordinarily already present in the engine system, i.e. little or no additional equipment, aside from a specially configured controller, is required. Thus, the system and method, in addition to facilitating improved emissions, combustion, and fuel economy, can be provided in a simple manner at minimal cost. Additionally, the system and method can be arranged to reduce abrupt changes in performance that might be disturbing to an operator. Further, the system and method can be arranged to discontinue adjustment of fuel injection in the event that a need for excessive fuel injection adjustment, which may be indicative of problems unrelated to fuel injection, is called for. Further still, the system and method can be arranged to discontinue adjustment of fuel injection when potential false signals that would lead to fuel injection adjustment are detected.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
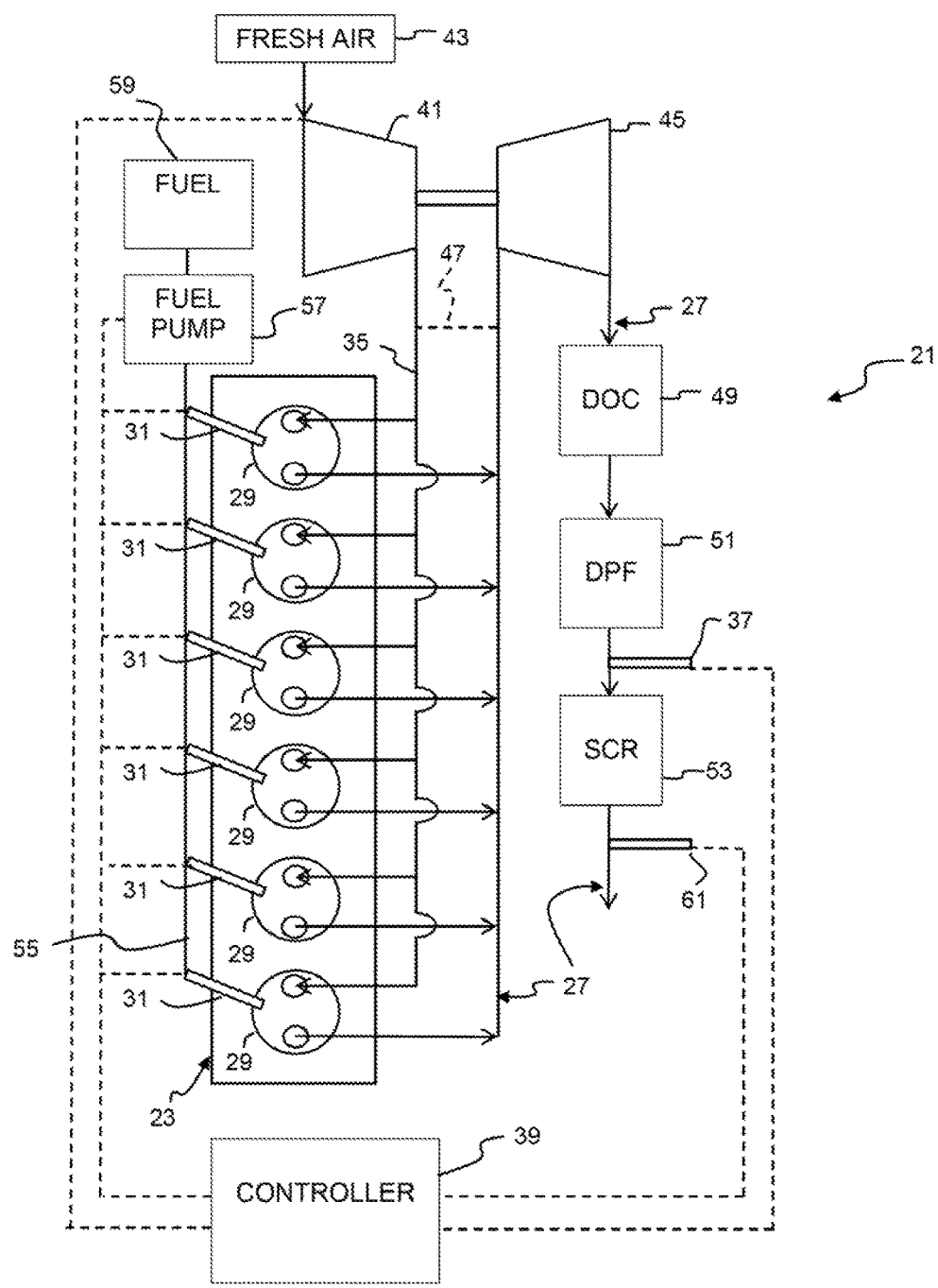
FIG. 1 is a schematic view of an engine system with a fuel system control arrangement according to an aspect of the present invention.

An engine system 21 including a fuel system control arrangement is shown in FIG. 1 and comprises an internal combustion engine 23 comprising an exhaust line 27, one or more cylinders 29, and one or more fuel injectors 31 corresponding to the one or more cylinders. Means is provided for determining fresh air mass flow into an intake 35 to the engine 23. A nitrogen oxide (NOx) sensor 37 is provided in the exhaust line 27.

A controller 39 is provided configured to determine O2 in exhaust gas based on a signal from the NOx sensor 37 and to calculate a current fuel injection quantity based on the oxygen (O2) in the exhaust gas and determined fresh air mass flow into the intake 35, to compare the current fuel injection quantity to a theoretical fuel injection quantity under current operating conditions, and to adjust an amount of fuel injection from the one or more fuel injectors 31 when the current fuel injection quantity differs from the theoretical fuel injection quantity to make the current fuel injection quantity closer to the theoretical fuel injection quantity. The controller 39 can be any suitable equipment capable of performing the operations described herein, such as an engine control unit (ECU).

It will be appreciated that known NOx sensors often provide a lambda, or O2, value and the reference to the controller determining O2 is intended to encompass structures and methods wherein the determination of O2 is provided by the NOx sensor, i.e. wherein the controller may be considered to include the NOx sensor.

It will further be appreciated that references to an "amount" of fuel injection can encompass a variety of measures, such as a particular volume of fuel, however, for purposes of discussion in the present application, an amount will ordinarily be understood to refer to a percentage of the fuel injection, except where otherwise indicated.

The means for determining fresh air mass flow into the intake may be in the form of suitable air mass flow sensors, however, it is presently preferred to determine fresh air mass flow via an airflow model. One form of a suitable airflow model involves a calculation that takes different sensor inputs and uses these to determine all of the major airflows throughout the different airflow paths on the engine. In a presently preferred airflow model, the main inputs are exhaust gas recirculation (EGR) differential pressure, EGR temperature, engine speed, boost pressure, boost temperature, requested torque, volumetric efficiency, and EGR position. Using these inputs it is possible to determine the airflow (in, e.g., kg/s) for the EGR system and the charge flow system. When the charge flow and EGR flow are both known, then the fresh airflow will be the difference between these two.

The theoretical fuel injection quantity will ordinarily be determined from performance of an engine model at a current load and speed of the engine. Current load and speed may be determined from, e.g., throttle (or accelerator pedal) position and sensors that measure engine speed. A form of a suitable engine model determines the theoretical fuel injection quantity using a six dimensional model that references the inputs and determines how much fuel should be requested to maintain the torque requirement based on the inputs. In a presently preferred diesel engine model, the inputs used are engine speed, requested torque, timing angle, rail pressure, EGR position, and throttle position. Inputs may be different in a non-diesel engine.

The engine system 21 may, in addition, include a turbocharger including a compressor 41 upstream of the intake 35 to the engine 23 for drawing fresh air from a source of fresh air 43 and a turbine 45 downstream of the engine in the exhaust line 27. The exhaust line 27 may be connected to the intake 35 via an exhaust gas recirculation (EGR) line 47 (shown in phantom) which may include an EGR cooler (not shown) and a valve (not shown) for opening and closing the EGR line. The exhaust line 27 will ordinarily include a diesel oxidation catalyst (DOC) 49 and diesel particulate filter (DPF) 51 downstream of the turbine 45 and upstream of a selective catalyst reduction device (SCR) 53.

The fuel injectors 31 are typically connected to a fuel line 55 which, in turn, is connected to a fuel pump 57 and a source of fuel 59. To adjust the amount of fuel injection, the fuel pump 57 may be controlled by the controller 39 and/or the operation of the individual fuel injectors 31 may be controlled by the controller.

Ordinarily, but not necessarily, the controller 39 will be configured to adjust the amount of fuel injection only when the current fuel injection quantity differs from the theoretical fuel injection quantity by more than a predetermined amount from the theoretical fuel injection quantity. For example, when the current fuel injection quantity is approximately 15% lower than the theoretical fuel injection, then the current fuel injection might be increased by 10%. Similarly, when the current fuel injection quantity is approximately 28% higher than the theoretical fuel injection, then the current fuel injection will be decreased by about 1%. The controller 39 can, of course, adjust fuel injection whenever the current fuel injection quantity differs from the theoretical fuel injection quantity, regardless if a trigger point has been reached. The foregoing discussion is merely illustrative and different difference amounts may trigger correction of the current fuel injection quantity, and may do so in different amounts than described. It is presently contemplated that larger corrections will typically be required when current fuel injection is lower than theoretical fuel injection than when current fuel injection is higher than theoretical fuel injection because insufficient fuel injection will ordinarily tend to result in lower combustion temperatures which, in turn, can result in less favorable emissions characteristics.

Figure 2:
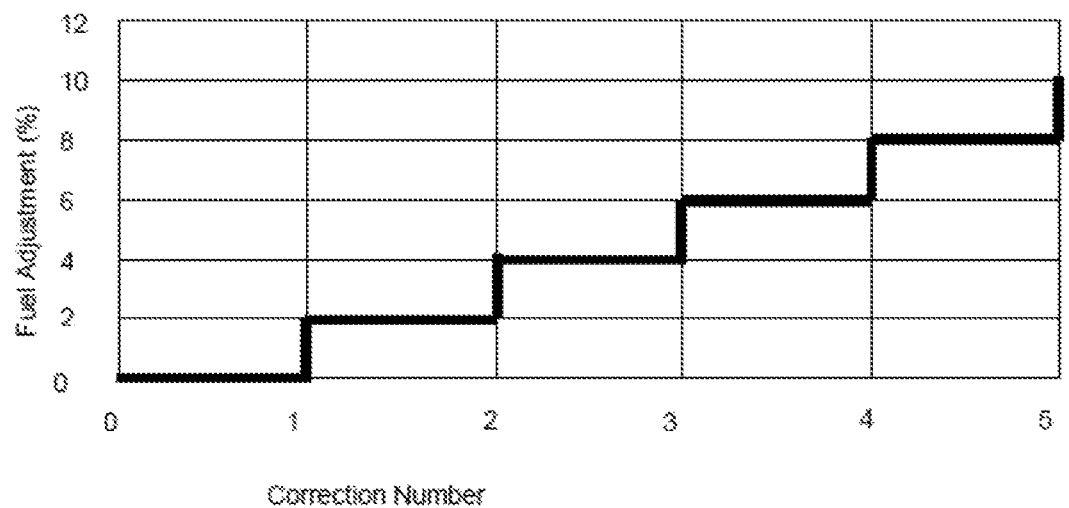
FIG. 2 is a graph illustrating fuel adjustment during successive corrections according to an aspect of the present invention.

The controller 39 can be configured to adjust the amount of fuel injection by no more than a predetermined amount for a given drive cycle of the engine 23. A "drive cycle" may consist of the starting and stopping of the engine, although other cycles, such as periods of time, may be selected. For example, in the example described above, when the current fuel injection quantity is approximately 15% lower than the theoretical fuel injection, then the controller 39 may determine that the current fuel injection must be increased by 10%, but may do so over the course of multiple drive cycles, such as several successive drive cycles, such as by increasing current fuel injection by 2% of the current fuel injection over the course of five successive or non-successive corrections or drive cycles as shown in FIG. 2. The maximum correction permitted for a given drive cycle in this example would be 2% of the current fuel injection at the time that it was determined that a correction is required. The drive cycles may be successive but do not need to be successive. By adjusting fuel injection over the course of several drive cycles, changes in performance of the engine will be less likely to be detectable by an operator. After a triggering event such as a sufficient difference between current fuel injection quantity and theoretical fuel injection is reached, e.g., 15% below or 28% above, the system will then ordinarily remain in a correction mode for as many drive cycles as it takes to eliminate the difference or make a maximum permissible adjustment, even though the difference between current fuel injection quantity and theoretical fuel injection will have fallen below the level that triggered the correction.

Ordinarily, but not necessarily, the controller 39 will be configured to adjust the amount of fuel injection by the predetermined amount over the course of multiple drive cycles of the engine until a difference between the current fuel injection quantity from the theoretical fuel injection quantity is less than a second predetermined amount, or until the correction reaches a maximum permitted amount. The controller 39 will ordinarily, but not necessarily, correct the fuel injection by an amount less than or equal to the difference between the current fuel injection quantity and the theoretical fuel injection quantity. For example, when the difference between the current fuel injection quantity and the theoretical fuel injection quantity reaches a particular level, say, current fuel injection quantity is about 15% lower than theoretical fuel injection quantity, then an adjustment of 10% of current fuel injection quantity is made.

To illustrate, when current fuel injection quantity is some predetermined percentage, say 15%, lower than theoretical fuel injection quantity, then an adjustment of 2% of the current fuel injection quantity may be made over the course of five corrections (usually five drive cycles) until current fuel injection quantity has been increased by 10% and current fuel injection quantity is less than 5% lower than theoretical fuel injection quantity at which point the correction stops. For example, after a first correction of 2% during a first correction (illustrated by a substantially vertical line), the difference between current fuel injection quantity and theoretical fuel injection quantity may drop from 15% to about 13%; after a second correction of 2% during a second correction, the difference between current fuel injection quantity and theoretical fuel injection quantity may drop from about 13% to about 11%; after a third correction of 2% during a third correction, the difference between current fuel injection quantity and theoretical fuel injection quantity may drop from about 11% to about 9%; after a fourth correction of 2% during a fourth correction, the difference between current fuel injection quantity and theoretical fuel injection quantity may drop from about 9% to about 7%; and after a fifth correction of 2% during a fifth correction, the difference between current fuel injection quantity and theoretical fuel injection quantity may drop from about 7% to about 5%. At this point, further correction might continue, or correction might stop because a maximum amount of correction has been performed, or correction might stop because the difference between current fuel injection quantity and theoretical fuel injection quantity is less than some predetermined amount. In a presently preferred embodiment, an adjustment of no more than 2.5% of the current fuel injection quantity is made during a given correction.

It will be appreciated that the correction can stop at any desired point, such as when current fuel injection quantity equals theoretical fuel injection quantity or is less than or greater than the theoretical fuel injection quantity by some desired amount.

Instead of, or in addition to, adjusting fuel injection by no more than a predetermined amount for each correction (usually each drive cycle) of the engine 23, the controller 39 may be configured to adjust the amount of fuel injection by no more than a predetermined amount, or by no more than a predetermined amount over a predetermined amount of time. For example, in the illustration shown in FIG. 2, after a first correction of a maximum of 2% of the current fuel injection at the time that it was determined that a correction is required is performed, the second correction of 2% of the current fuel injection at the time that it was determined that a correction is required might be performed no sooner than one hour, or one day, or any desired time period, after the first correction, the third correction of 2% of the current fuel injection at the time that it was determined that a correction is required might be performed no sooner than one hour, or one day, or any desired time period, after the second correction (not necessarily the same time period as the period between the first and second corrections), and so on. In this way, the possibility of abrupt changes in performance can be reduced.

Additionally, instead of performing a correction more or less instantaneously, the correction itself might be performed over an extended period of time to avoid abrupt changes in performance.

The controller 39 may be configured to adjust the amount of fuel injection by the predetermined amount over the predetermined amount of time until a difference between the current fuel injection quantity from the theoretical fuel injection quantity is less than a second predetermined amount. As with the adjustment described in connection with drive cycles, the adjustment may be stopped when the difference is less than (or equal to or greater than) a certain percentage, or when the total adjustment reaches a predetermined amount.

Additionally, the controller 39 may be configured to adjust the amount of fuel injection by no more than a predetermined amount over a predetermined amount of time in the sense that no more than a predetermined amount of correction may be performed in a given period of time. For example, corrections above 10% over the course of a week may not be permitted. This can facilitate avoiding problems such as continuing to correct for fuel injection when the difference between current fuel injection and theoretical fuel injection is due to some issue other than fuel injection.

The controller 39 may further be configured to adjust the amount of fuel injection to make the current fuel injection quantity closer to the theoretical fuel injection quantity by no more than a predetermined amount in response to a determination that the current fuel injection quantity differs from the theoretical fuel injection quantity, regardless of the amount of time or number of drive cycles over which the correction might be made. For example, corrections over 10% of current fuel injection quantity may not be permitted. This, too, can facilitate avoiding problems such as continuing to correct for fuel injection when the difference between current fuel injection and theoretical fuel injection is due to some issue other than fuel injection.

The NOx sensor 37 is ordinarily positioned upstream of a selective catalyst reduction device (SCR) 41 in the exhaust line 27. A second NOx sensor 61 can be positioned downstream of the SCR 53, and the controller 39 can be configured to calculate the O2 in the exhaust gas based on a signal from the second NOx sensor while, at the same time, calculating the O2 in the exhaust gas based on a signal from the first NOx sensor. The controller 39 can be configured to discontinue adjusting fuel injection when a difference in the calculated O2 from the NOx sensor 37 and the second NOx sensor 61 exceeds a predetermined amount. In this way, the possibility of a correction of fuel injection quantity due to a fault in the NOx sensor 37 such that an incorrect O2 value is calculated which, in turn, might lead to an incorrect determination of current fuel injection quantity can be minimized.

Aspects of a method for controlling fuel injection in an internal combustion engine is described in connection with FIGS. 3-6. For all of the aspects of the method for controlling fuel injection in an internal combustion engine, the engine 23 can comprise an exhaust line 27, one or more cylinders 29, and one or more fuel injectors 31 corresponding to the one or more cylinders, such as is described in connection with FIG. 1.

Figure 3:
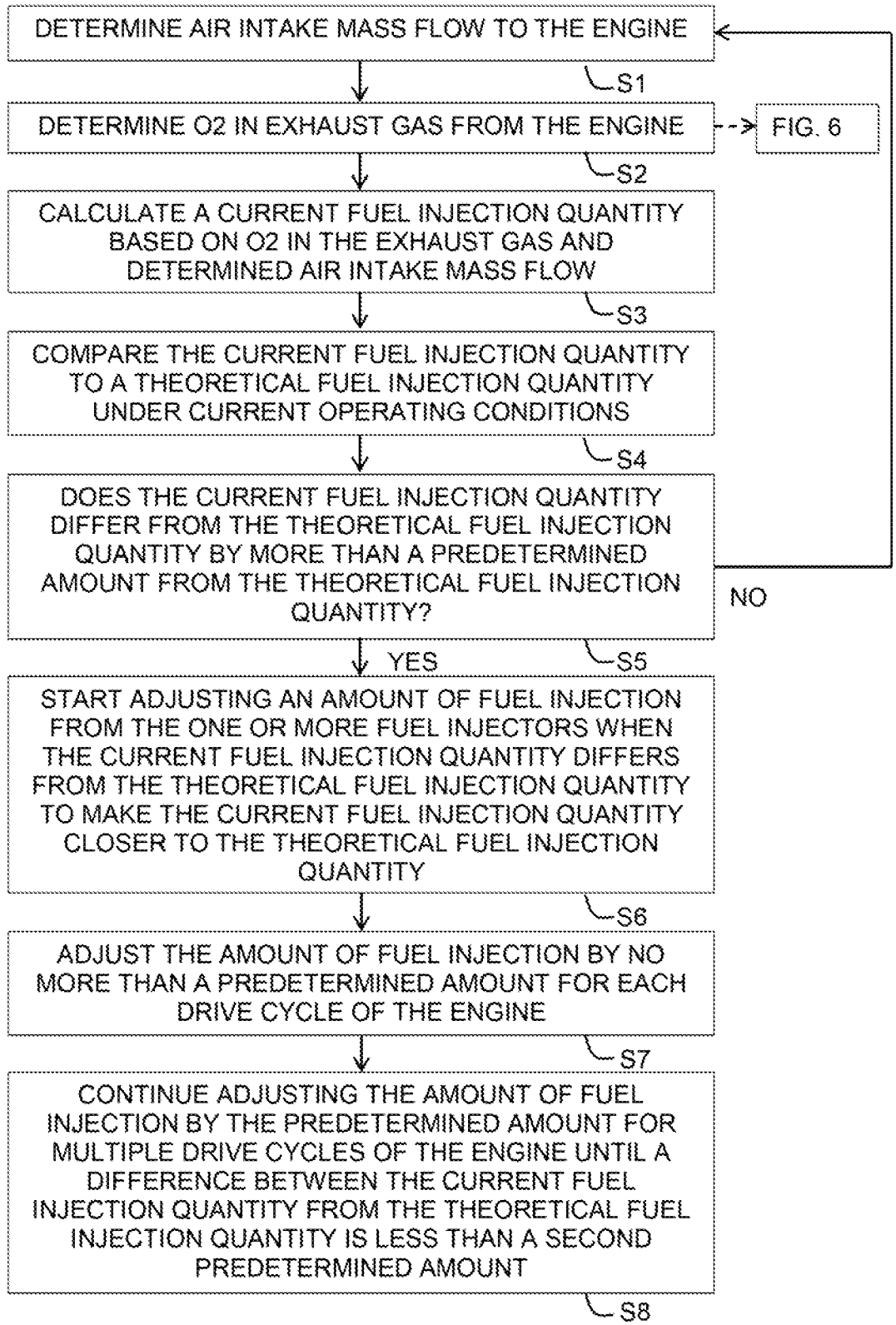
FIG. 3 is a flow chart showing steps in a method according to an aspect of the present invention.
Figure 4:
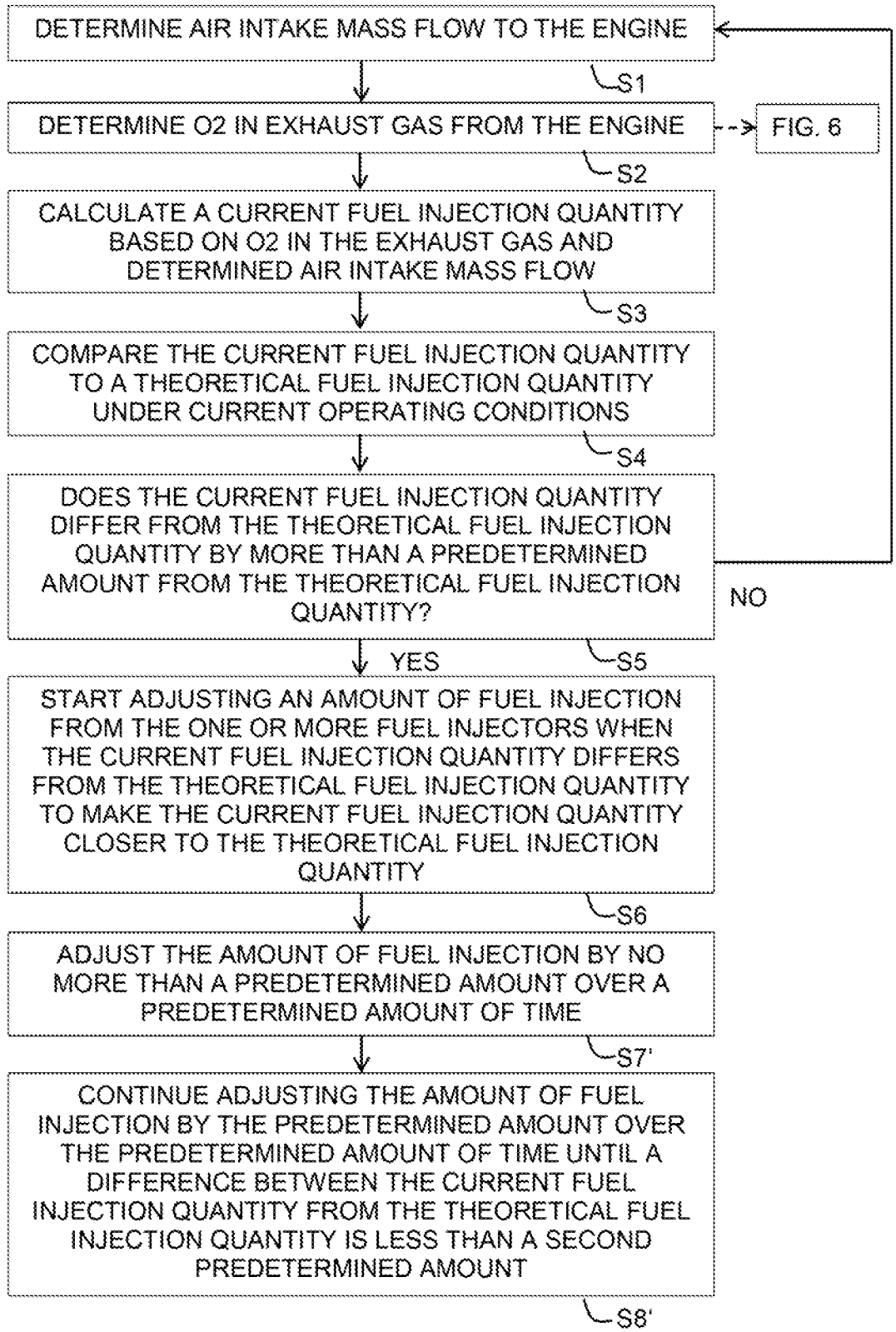
FIG. 4 is a flow chart showing steps in another method according to an aspect of the present invention.
Figure 5:
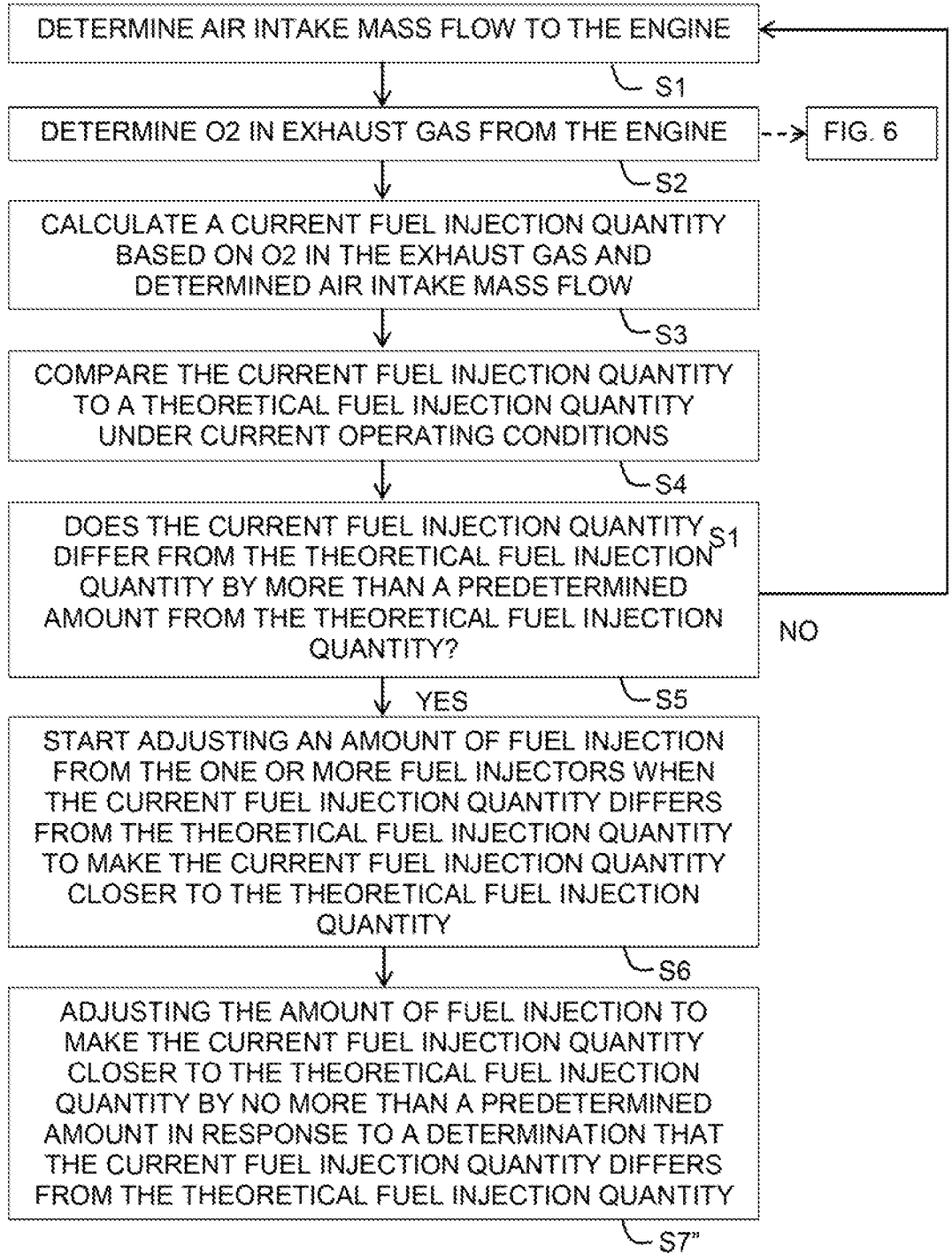
FIG. 5 is a flow chart showing steps in yet another method according to an aspect of the present invention.

The methods shown in FIGS. 3-5 include a step S1 of determining fresh air mass flow into an intake 35 to the engine 23.

In a step S2, O2 in exhaust gas from the engine 23 is determined. O2 in the exhaust gas from the engine 23 may be determined in any suitable way, such as based on a signal from a NOx sensor in the exhaust line 27.

In a step S3, a current fuel injection quantity is calculated based on the O2 in the exhaust gas and determined fresh air mass flow into the intake 35. The determined fresh air mass flow into the intake 35 can be determined in any suitable manner, such as by using an airflow model.

In a step S4, the current fuel injection quantity is compared to a theoretical fuel injection quantity under current operating conditions. The theoretical fuel injection quantity can be provided in any suitable way, such as via engine modeling.

In a step S5, it is determined whether the current fuel injection quantity differs from the theoretical fuel injection quantity. Usually, but not necessarily, the determination at step S5 involves whether the current fuel injection quantity differs from the theoretical fuel injection quantity by more than a predetermined quantity. If the current fuel injection quantity does not differ from the theoretical fuel injection quantity, or does not differ from the theoretical fuel injection quantity by the predetermined quantity, then the method returns to step S1 and continuously or periodically repeats steps S1-S5 until the current fuel injection quantity does differ from the theoretical fuel injection quantity, or differs by the predetermined quantity.

When the current fuel injection quantity differs from the theoretical fuel injection quantity, or differs by the predetermined quantity, then the method proceeds to step S6 wherein an amount of fuel injection from the one or more fuel injectors is adjusted to make the current fuel injection quantity closer to the theoretical fuel injection quantity.

In the method shown in FIG. 3, in a step S7 the amount of fuel injection is adjusted by no more than a predetermined amount for a given drive cycle of the engine 23, and the amount of fuel injection may be adjusted over the course of multiple drive cycles of the engine 23. At a step S8, fuel injection continues to be adjusted until the controller 39 determines that a fuel adjustment is no longer necessary, such as when a difference between the current fuel injection quantity from the theoretical fuel injection quantity is less than a second predetermined amount. For example, after a first correction of 2% during a first drive cycle, the difference between current fuel injection quantity and theoretical fuel injection quantity may drop from 15% to about 13%; after a second correction of 2% during a second drive cycle, the difference between current fuel injection quantity and theoretical fuel injection quantity may drop from about 13% to about 11%; after a third correction of 2% during a third drive cycle, the difference between current fuel injection quantity and theoretical fuel injection quantity may drop from about 11% to about 9%; after a fourth correction of 2% during a fourth drive cycle, the difference between current fuel injection quantity and theoretical fuel injection quantity may drop from about 9% to about 7%; and after a fifth correction of 2% during a fifth drive cycle, the difference between current fuel injection quantity and theoretical fuel injection quantity may drop from about 7% to about 5%.

In the method shown in FIG. 4, steps S1-S6 are performed and, in a step S7', the amount of fuel injection is adjusted by no more than a predetermined amount over a predetermined amount of time. At a step S8', fuel injection continues to be adjusted by no more than the predetermined amount over the predetermined amount of time over multiple units of the predetermined amount of time until the controller determines that a fuel adjustment is no longer necessary, such as until a difference between the current fuel injection quantity from the theoretical fuel injection quantity is less than a second predetermined amount. For example, after a first correction of a maximum of 2% of the current fuel injection at the time that it was determined that a correction is required is performed, the second correction of 2% of the current fuel injection at the time that it was determined that a correction is required might be performed no sooner than one hour, or one day, or any desired time period, after the first correction, the third correction of 2% of the current fuel injection at the time that it was determined that a correction is required might be performed no sooner than one hour, or one day, or any desired time period, after the second correction (not necessarily the same time period as the period between the first and second corrections), and so on.

The fuel injection may also continue to be adjusted by no more than a total predetermined amount over some particular predetermined amount of time. For example, corrections above 10% over the course of a week may not be permitted.

In the method shown in FIG. 5, steps S1-S6 are performed and, in a step S7", the amount of fuel injection is adjusted to make the current fuel injection quantity closer to the theoretical fuel injection quantity by no more than a predetermined amount in response to a determination that the current fuel injection quantity differs from the theoretical fuel injection quantity. In other words, fuel injection adjustment is permitted until a total amount of fuel adjustment reaches a particular percentage, and then no further adjustment is permitted, regardless whether there continues to be a difference between the current fuel injection quantity and the theoretical fuel injection quantity.

Figure 6:
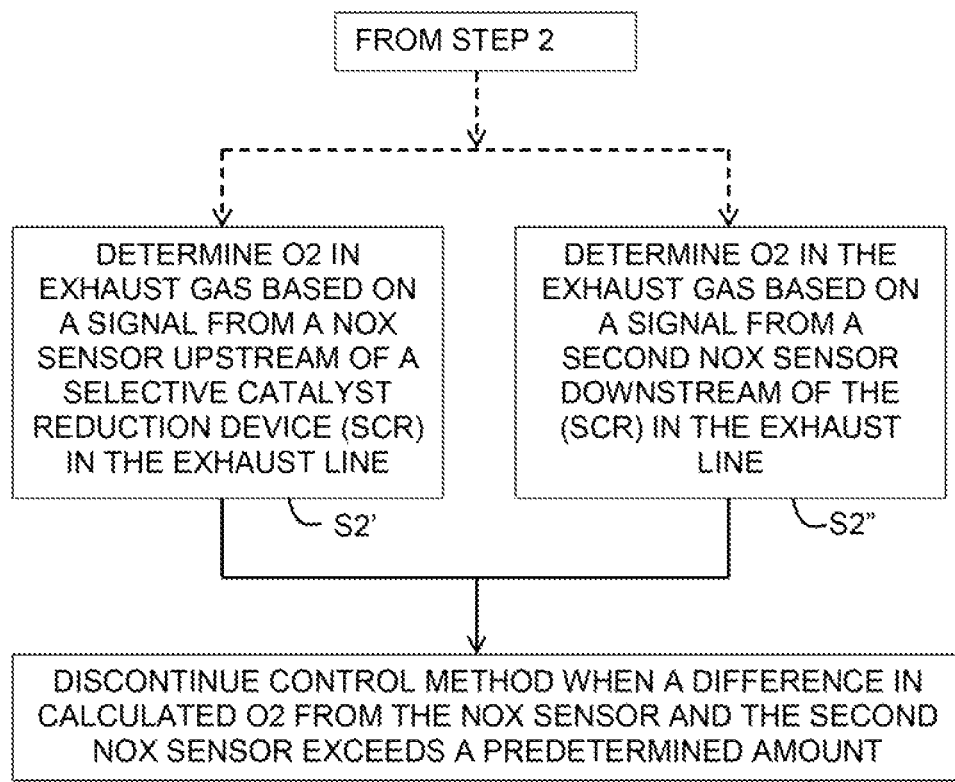
FIG. 6 is a flow chart showing steps in an aspect of a method applicable to the methods shown in FIGS. 3-5.

All of the methods shown in FIGS. 3-5 can further be operated according to the method shown in FIG. 6. According to this aspect of the method, the NOx sensor 37 is upstream of the SCR 53 in the exhaust line 27, and a second NOx sensor 61 is downstream of the SCR. At step S2, the method comprises, in addition to determining the O2 in the exhaust gas based on a signal from the NOx sensor 37 at step S2', also determining the O2 in the exhaust gas based on a signal from the second NOx sensor 61 at step S2". The control method is discontinued at step S2''' when a difference in O2 determined based on the signals from the NOx sensor 37 and the second NOx sensor 61 exceeds a predetermined amount.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. An engine system including a fuel system control arrangement, comprising:
   an internal combustion engine comprising an exhaust line, one or more cylinders, and one or more fuel injectors corresponding to the one or more cylinders and arranged for injecting fuel into the one or more cylinders;
   means for determining fresh air mass flow into an intake to the engine;
   a nitrogen oxide (NOx) sensor in the exhaust line; and
   a controller configured to determine oxygen (O2) in exhaust gas based on a signal from the NOx sensor and to calculate a current fuel injection quantity based on the O2 in the exhaust gas and determined fresh air mass flow into the intake, to compare the current fuel injection quantity into the one or more cylinders to a theoretical fuel injection quantity into the one or more cylinders under current operating conditions, and to respond to a determination that the current fuel injection quantity differs from the theoretical fuel injection quantity by adjusting an amount of fuel injection from the one or more fuel injectors to make the current fuel injection quantity closer to the theoretical fuel injection quantity.

2. The engine system as set forth in claim 1, wherein the means for determining fresh air mass flow into the intake comprises an airflow model.

3. The engine system as set forth in claim 1, wherein the controller is configured to adjust the amount of fuel injection only when the current fuel injection quantity differs from the theoretical fuel injection quantity by more than a predetermined amount from the theoretical fuel injection quantity.

4. The engine system as set forth in claim 1, wherein the controller is configured to adjust the amount of fuel injection by no more than a predetermined amount for any drive cycle of the engine.

5. The engine system as set forth in claim 4, wherein the controller is configured to adjust the amount of fuel injection by the predetermined amount over the course of multiple drive cycles of the engine until a difference between the current fuel injection quantity from the theoretical fuel injection quantity is less than a second predetermined amount.

6. The engine system as set forth in claim 1, wherein the controller is configured to adjust the amount of fuel injection by no more than a predetermined amount over a predetermined amount of time.

7. The engine system as set forth in claim 6, wherein the controller is configured to adjust the amount of fuel injection by the predetermined amount over the predetermined amount of time until a difference between the current fuel injection quantity from the theoretical fuel injection quantity is less than a second predetermined amount.

8. The engine system as set forth in claim 1, wherein the controller is configured to adjust the amount of fuel injection to make the current fuel injection quantity closer to the theoretical fuel injection quantity by no more than a predetermined amount in response to a determination that the current fuel injection quantity differs from the theoretical fuel injection quantity.

9. The engine system as set forth in claim 1, wherein the NOx sensor is upstream of a selective catalyst reduction device (SCR) in the exhaust line, and a second NOx sensor is downstream of the SCR, and the controller is configured to calculate the O2 in the exhaust gas based on a signal from the second NOx sensor, and to discontinue adjusting fuel injection when a difference in the calculated O2 from the NOx sensor and the second NOx sensor exceeds a predetermined amount.

10. The engine system as set forth in claim 1, wherein the theoretical fuel injection quantity is determined from performance of an engine model at a current load and speed of the engine.

11. A method for controlling fuel injection in an internal combustion engine, the engine comprising an exhaust line, one or more cylinders, and one or more fuel injectors corresponding to the one or more cylinders and arranged for injecting fuel into the one or more cylinders, comprising:
  determining fresh air mass flow into an intake to the engine;
  determining oxygen (O2) in exhaust gas from the engine;
  calculating a current fuel injection quantity based on the O2 in the exhaust gas and determined fresh air mass flow into the intake;
  comparing the current fuel injection quantity into the one or more cylinders to a theoretical fuel injection quantity into the one or more cylinders under current operating conditions; and
  responding to a determination that the current fuel injection quantity differs from the theoretical fuel injection quantity by adjusting an amount of fuel injection from the one or more fuel injectors to make the current fuel injection quantity closer to the theoretical fuel injection quantity.

12. The method as set forth in claim 11, comprising determining the O2 in the exhaust gas based on a signal from a nitrogen oxide (NOx) sensor in the exhaust line.

13. The method as set forth in claim 12, wherein the NOx sensor is upstream of a selective catalyst reduction device (SCR) in the exhaust line, and a second NOx sensor is downstream of the SCR, the method comprising determining the O2 in the exhaust gas based on a signal from the second NOx sensor, and to discontinue the control method when a difference in O2 determined based on the signals from the NOx sensor and the second NOx sensor exceeds a predetermined amount.

14. The method as set forth in claim 11, comprising determining fresh air mass flow into the intake using an airflow model.

15. The method as set forth in claim 11, comprising adjusting the amount of fuel injection only when the current fuel injection quantity differs from the theoretical fuel injection quantity by more than a predetermined amount from the theoretical fuel injection quantity.

16. The method as set forth in claim 11, comprising adjusting the amount of fuel injection by no more than a predetermined amount for any drive cycle of the engine.

17. The method as set forth in claim 16, comprising adjusting the amount of fuel injection by the predetermined amount over the course of multiple drive cycles of the engine until a difference between the current fuel injection quantity from the theoretical fuel injection quantity is less than a second predetermined amount.

18. The method as set forth in claim 11, comprising adjusting the amount of fuel injection by no more than a predetermined amount over a predetermined amount of time.

19. The method as set forth in claim 18, comprising adjusting the amount of fuel injection by the predetermined amount over the predetermined amount of time until a difference between the current fuel injection quantity from the theoretical fuel injection quantity is less than a second predetermined amount.

20. The method as set forth in claim 11, comprising adjusting the amount of fuel injection to make the current fuel injection quantity closer to the theoretical fuel injection quantity by no more than a predetermined amount in response to a determination that the current fuel injection quantity differs from the theoretical fuel injection quantity.

* * * * *